United States Patent [19]

Römmele et al.

[11] 4,118,515
[45] Oct. 3, 1978

[54] PREPARATION OF A STABLIZED PAPAIN SOLUTION

[75] Inventors: Günter Römmele, Riehen; Ruth Hagemann, Basel, both of Switzerland

[73] Assignee: Ciba-Geigy Corporation, Ardsley, N.Y.

[21] Appl. No.: 750,785

[22] Filed: Dec. 15, 1976

[30] Foreign Application Priority Data

Dec. 23, 1975 [CH] Switzerland .................... 16703/75

[51] Int. Cl.² .......................... C12H 1/12; C07G 7/02
[52] U.S. Cl. ...................................... 426/63; 195/63; 195/68; 426/12
[58] Field of Search ................ 426/12, 63; 195/63, 195/68

[56] References Cited

U.S. PATENT DOCUMENTS 3,095,358  6/1963  Meister .................................. 195/63

FOREIGN PATENT DOCUMENTS 1,326,681  8/1973  United Kingdom.

Primary Examiner—David M. Naff
Attorney, Agent, or Firm—Frederick H. Rabin

[57] ABSTRACT

An aqueous papain solution having improved storage stability for preventing cold turbidity in beer is prepared by dissolving sodium metabisulphite in water, adjusting the pH with sodium hydroxide to about 4.85, adding papain to obtain a turbid solution, clarifying the turbid solution and adding sucrose while stirring. The papain solution contains by weight 20 to 60% sucrose, 1.5 to 3% sodium metabisulphite and 1 to 35% papain.

3 Claims, No Drawings

PREPARATION OF A STABLIZED PAPAIN SOLUTION

The present invention relates to an agent for preventing cold turbidity in beer which agent comprises an aqueous papain solution having an improved storage stability.

Normally, it is necessary to keep cool during storage or transport in order to maintain its quality but this frequently results in adverse changes in the beer. Thus, a phenomenon which is known to those skilled in the art as so-called cold turbidity can arise after a cooling period of varying length and represents a lowering in the quality, both from the optical and the organoleptic point of view. It is not seldom that this turbidity phenomenon is so serious that beer denatured in this way is no longer acceptable for human consumption and the possibility for commercial sale is thus lost. In order to avoid the losses associated therewith, it is of great economic importance so to stabilise beer that cold turbidity does not arise when it is kept cool.

The phenomenon of cold turbidity is due to the coagulation of proteins originally dissolved in the beer, so that the use of substances, for example proteases, which keep the proteins in solution as a result of degradation without, in addition, having an adverse effect on the constituents and quality of the beer is a possible method of prevention. Papain has proved to be especially suitable for this purpose. In this field, therefore, both solid and liquid formulations in the form of mixtures of papain with additives have already been produced, the additives exerting a stabilising action on the activity of the enzyme.

Known additives are polyols and carbohydrates, in addition to sodium metabisulphite. In U.S. Pat. No. 3,095,358, sorbitol, propylene glycol, glycerol, corn syrup, gum arabic and sucrose are mentioned in this context, but, with the exception of sorbitol, it has not been possible to achieve any satisfactory results in respect of the stability of the papain solutions. Thus, it is reported in the said patent specification that, for example, substantial sediments very rapidly arise at room temperature in papain solutions to which sucrose is added.

British patent specification No. 1,326,681, on the other hand, describes papain formulations which also contain corn syrup, sorbitol or sucrose in addition to sodium metabisulphite but with these formulations it is necessary—when they are in a liquid-aqueous form—to lower the pH value of these solutions by adding acids such as citric acid, phosphoric acid or tartaric acid in order to retain their proteolytic activity.

By means of the present invention it has now proved possible, surprisingly, to manufacture aqueous formulations of commercially accessible papain which, in respect of the retention of the proteolytic enzyme activity, display a high storage stability under room temperature conditions. The papain solutions according to the invention are characterised in that they contain 20 to 60% by weight of sucrose and 1.5 to 3% by weight of sodium metabisulphite in addition 1 to 35% by weight of papain. Furthermore, up to 10% by weight of sorbitol can optionally be added to these papain solutions in order to prevent intrinsic opalescence phenomena which may arise on prolonged storage.

Compared with the known papain formulations, the essential advantage is that, although it is in a liquid form, the agent according to the invention can be stored for a prolonged period even at room temperature or for at least several weeks at higher temperatures, such as are customary in the tropics, without any significant losses in the proteolytic activity arising. Storage in a cooled location, which is necessary in the case of the corresponding known formulations, is thus no longer required and as a result both unlimited availability is ensured and no additional expenditure of any type on storage costs arises. Furthermore, with the papain solutions according to the invention it is not necessary to add acid in order to retain their enzymatic activity. Moreover, the use of sucrose has the advantage that, because its raw material price is low compared with that of the additives otherwise customary, the manufacture of the new papain formulations is very inexpensive. Since sucrose is normally used as a foodstuff, its use in the present case is totally acceptable physiologically. In the cases where sucrose has already been used as a constituent of solid papain formulations, serious disadvantages had to be accepted. Thus, when pulverulent enzyme formulations are handled there is a danger, due to their tendency to dust, that they will cause allergies in the personnel and precautions have to be taken against this, with additional expense; however, this is not necessary in the case of the liquid formulation according to the present invention. An improved metering capacity and, thus, more rational and economical use is a further characteristic of the liquid use form according to the invention which indicates its superiority over solid papain formulations.

In order to demonstrate the superiority of the agent according to the invention over known papain formulations, the storage stability was tested both at room temperature and in an accelerated test (7 days at 60° C). In these tests only the additive producing the stability has been varied. The assessment of the storage stability was made with the aid of the measurement of the proteolytic activity before and after the storage period in a collagen degradation test. The results of the accelerated test are summarised in the table which follows.

TABLE

| | Residual activity [%] after storage in the accelerated test MEASURED | |
|---|---|---|
| | with an activator (cystein) | without an activator |
| Formulation 1 | | |
| 13.5% by weight of papain P 1 (Messrs. Enzymase/Brussels) | | |
| 3 % by weight of analytical grade $Na_2S_2O_5$ Merck, No. 6,528 | 98 | 100 |
| 45 % by weight of sucrose, Merck, No. 7,651 | | |
| 38.5% by weight of distilled water | | |
| Formulation 2 | | |
| 45 % by weight of analytical grade anhydrous glycerol, Fluka, No. 49,770 | 60 | 62 |
| (as replacement for sucrose, otherwise analogous to 1) | | |
| Formulation 3 | | |
| 40 % by weight of corn syrup (commercially available product | 40 | 42 |
| (as replacement for sucrose, otherwise analogous to 1) | | |
| Formulation 4 | | |
| 45 % by weight of pure crystalline sorbitol, Fluka, No. 85,532 | 34 | 32 |
| (as replacement for sucrose, | | |

TABLE-continued

| | Residual activity [%] after storage in the accelerated test MEASURED | |
|---|---|---|
| | with an activator (cystein) | without an activator |
| otherwise analogous to 1) COLLUPULIN (commercially available product) | 65 | 66 |

EXAMPLE

(a) Composition 13.5% by weight of Papain P 1* (relative to a specific activity: 52,000 NF units/mg) **

2% by weight of analytical grade anhydrous sodium metabisulphite ($Na_2S_2O_5$)

45% by weight of P.h.H.V. sucrose ($C_{12}H_{22}O_{11}$)

39.5% by weight of distilled water

* [Messrs. Enzymase/Brussels (Belgium)]  ** [First Suppl. Food Chemicals Codex, 2 Edition 1974, page 86]

(b) Procedure (Preparation of 1 kg of the liquid formulation)

20 Grams of sodium metabisulphite are dissolved in 395 ml of distilled water, whilst stirring. The pH is then corrected to a pH of 4.85 with 0.1 N NaoH. 135 grams of papain are added, whilst stirring, and the mixture is stirred for about a further 10 minutes.

The turbid solution is then completely clarified by centrifuging or by filtration.

450 Grams of sucrose are added, whilst stirring, and the mixture is stirred for a further 10 minutes.

The pH value and the weight of the formulation produced are then checked.

What is claimed is:

1. A process for preparing an aqueous papain solution comprising from 20 to 60% by weight of sucrose, from 1.5 to 3% by weight of sodium metabisulphite and from 1 to 35% by weight of papain, which process comprises the steps of (1) dissolving sodium metabisulphite in water and adjusting the pH to about 4.85 by addition of sodium hydroxide, (2) adding papain to obtain a turbid solution, (3) clarifying the turbid solution by filtration or centrifugation and (4) adding sucrose while stirring.

2. A process according to claim 1 in which the aqueous papain solution contains from 35 to 55% by weight of sucrose.

3. A process according to claim 1 in which the solution additionally contains up to 10% by weight of sorbitol.

* * * * *

Disclaimer 4,118,515.—*Gunter Rommele,* Riehen and *Ruth Hagemann,* Basle, Switzerland. PREPARATION OF A STABILIZED PAPAIN SOLUTION. Patent dated Oct. 3, 1978. Disclaimer filed Jan. 29, 1985, by the assignee, *Novo Industri A/S.*

Hereby disclaims the remaining term of said patent.
[*Official Gazette August 5, 1986.*]